US008279838B2

(12) United States Patent
Chou et al.

(10) Patent No.: US 8,279,838 B2
(45) Date of Patent: Oct. 2, 2012

(54) MOBILITY MECHANISMS FOR HOME CELLULAR NETWORK

(75) Inventors: Chie-Ming Chou, Cingshuei Township (TW); Fang-Ching Ren, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 466 days.

(21) Appl. No.: 12/545,097

(22) Filed: Aug. 21, 2009

(65) Prior Publication Data

US 2010/0111042 A1 May 6, 2010

Related U.S. Application Data (60) Provisional application No. 61/110,031, filed on Oct. 31, 2008.

(51) Int. Cl.
*H04W 4/00* (2009.01)
(52) U.S. Cl. ........................ 370/332; 455/444
(58) Field of Classification Search .................. 370/332; 455/444
See application file for complete search history.

(56) References Cited

U.S. PATENT DOCUMENTS

| 2007/0183427 | A1 | 8/2007 | Nylander et al. | |
| 2008/0153411 | A1 | 6/2008 | Claussen et al. | |
| 2008/0171553 | A1 | 7/2008 | Ren et al. | |
| 2008/0244148 | A1* | 10/2008 | Nix et al. | 710/313 |
| 2008/0261563 | A1 | 10/2008 | Drevon et al. | |
| 2009/0163216 | A1* | 6/2009 | Hoang et al. | 455/450 |
| 2009/0219888 | A1* | 9/2009 | Chen et al. | 370/331 |

FOREIGN PATENT DOCUMENTS

| EP | 1753252 | 2/2007 |
| WO | WO 2005/065214 | 7/2005 |
| WO | WO 2007/040449 | 4/2007 |

OTHER PUBLICATIONS

Extended European Search Report for Application No. 09252139.2, from the European Patent Office, dated Mar. 4, 2010.
Office Communication for Application No. 09252139.2, from the European Patent Office, dated Aug. 18, 2011.

* cited by examiner

*Primary Examiner* — Sai-Ming Chan
(74) *Attorney, Agent, or Firm* — Finnegan, Henderson, Farabow, Garrett & Dunner, LLP (57) ABSTRACT

A communication system comprises a communication network including a computer processor operating a network management system and a femtocell network management system. The communication system further comprises a broadband base station providing a first service signal and creating a mapping table configured to include at least one unique identifier of a mobile client device and a base station providing a second service signal and receiving the mapping table from the broadband base station. A computer processor in the communication system is configured to determine a link quality of a mobile client device service signal received by the broadband base station, the contents of the mapping table, and the unique identifier of the mobile client device to determine whether the broadband base station will provide the first service signal to the mobile client device or whether the base station will provide the second service signal to the mobile client device.

20 Claims, 6 Drawing Sheets

MOBILITY MECHANISMS FOR HOME CELLULAR NETWORK

PRIOR APPLICATION

This application claims the benefit of priority to U.S. Provisional Patent Application No. 61/110,031, filed Oct. 31, 2008, entitled "MOBILITY MECHANISMS FOR HOME CELLULAR NETWORK," the entire contents of which are hereby incorporated by reference in its entirety.

BRIEF DESCRIPTION

1. Technical Field

A system and method disclosed herein generally relate to wireless networking and, more specifically, to a system and method that increases wireless connectivity in an indoor network area.

2. Description of the Related Art

A conventional wireless network environment connects mobile electronic devices to a service provider. A wireless network environment is often configured to create a mobile communication system that may provide wireless service to mobile client devices. A mobile communication system often includes at least one base station and at least one client device, which is typically each configured to transmit and receive information to and from each other creating a communication link.

Conventionally, the number of base stations in a given geographic area depends on the service demand from the number of mobile client devices and the natural terrain of the geographic area. A mobile client device will usually request service from the nearest or most capable base station. Typically, as a mobile client device changes its geographic location, it will establish a communication link with the nearest or most capable base station that may meet its service demand.

A base stations may take on one of several forms. For example, a base station may be embodied by a computer configured to transmit and receive a conventional RF (radio frequency) signal. A base station may also be embodied by a computer configured to transmit and receive both a conventional RF signal and a broadband internet signal. In any form, however, the base station provides a type of communication link to a mobile client device.

A conventional problem in the art has been maintaining a communication link quality of sufficient strength to enable communication between a mobile client device and a base station in a wireless network. A mobile client device is designed to move freely throughout a geographic location while maintaining an communication link. Practically, however, there are many challenges to maintaining a satisfactory communication link. Geographical terrain, natural obstacles, and man made obstacles all affect the link quality of the communication link between a base station and a mobile client device. One solution to this conventional problem has been to increase the number of base stations in a given geographic area. This typically is done by creating macrocell networks. Macrocell networks are large geographic service areas that typically overlap to provide contiguous service to mobile client devices within the area. Increasing the number of base stations and macrocell networks in a given geographic area means that a mobile client device can never be as far from a base station in that geographic area as it was when fewer base stations were present.

In contrast to a macrocell network, a femtocell network is a small geographic service area in which signal strength provided to a mobile client device can be increased. There are two conventional types of femtocell networks. One type is an open access femtocell network and the other is a closed access femtocell network. A closed access femtocell network will only allow those mobile client devices which have previously registered with the femtocell network to gain access to the service signal. Unfortunately, when a mobile client device attempts to access the service signal from a closed access femtocell network to which it was not previously registered, significant processing ability is wasted by the femtocell network to recognize the mobile client is not registered and deny it a service connection. An open access femtocell allows a user access to the service signal without registration.

Femtocell networks are provided by a small low power base station. These small low power base stations are relatively inexpensive, easy to install, and provide a solution to the conventional problem. These same characteristics make these low power base stations ideal to increase overall connectivity in the wireless network environment by increasing the number of base stations in a given area.

This solution, however, presents a new problem. When the number of base stations within a given area increases the base station closest to the mobile client device will change much more rapidly as the mobile client device moves. To compensate, the mobile client device must re-acquire service from the closest base station much more frequently in order to maintain the strongest signal available. A mobile client device re-acquiring service from another base station in the wireless network is typically referred to as a handover or a handoff.

When the mobile client device receives a service signal from a base station that is stronger than the service signal which it currently receives, a handover may take place. In other words, one base station will handover its communication link with the mobile client device to the base station that can provide a stronger signal to the mobile client device. Drawbacks to these conventional handovers include significant processing costs, communication delays, and communication interruptions. As the number of base stations increases, the number of handovers each base station must execute increases.

As the number of handovers each base station must execute increases, the processing costs of the handover could overwhelm and eventually shut down a communications network. Thus, a need exists to increase the efficiency of a handover when a large number of additional base stations, such as femtocell networks, are implemented within a communication network.

SUMMARY

Consistent with embodiments disclosed, a communication system is disclosed. The system may include a communication network comprising a computer processor operating a network management system and a femtocell network management system; a broadband base station providing a first service signal and creating a mapping table configured to include at least one unique identifier of a mobile client device; and a base station providing a second service signal and receiving the mapping table from the broadband base station; wherein the computer processor is configured to determine a link quality of a mobile client device service signal received by the broadband base station, the contents of the mapping table, and the unique identifier of the mobile client device to determine whether the broadband base station will provide the first service signal to the mobile client device or whether the base station will provide the second service signal to the mobile client device.

Also consistent with embodiments disclosed is a method of executing a handover between a broadband base station and a base station in a communication system is disclosed. The method comprises providing a first service signal via a broadband base station; providing a second service signal via a base station; creating a mapping table configured to include a unique identifier of a mobile client device in the broadband base station; transmitting the mapping table from the broadband base station to the base station; determining a link quality of a mobile client device service signal received by the broadband base station and based on the link quality determining whether to provide the first service signal or the second service signal to the mobile client device; and providing the first service signal or the second service signal to the mobile client device.

Consistent with yet other embodiments disclosed, a computer-readable storage medium is disclosed. The medium comprises computer instructions which when executed on a computer processor cause the processor to perform a method of executing a handover between a broadband base station and a base station in a communication system. The method comprises: providing a first service signal via a broadband base station; providing a second service signal via a base station; creating a mapping table configured to include a unique identifier of a mobile client device in the broadband base station; transmitting the mapping table from the broadband base station to the base station; determining a link quality of a mobile client device service signal received by the broadband base station and based on the link quality determining whether to provide the first service signal or the second service signal to the mobile client device; and providing the first service signal or the second service signal to the mobile client device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

In the following description, for purposes of explanation and not limitation, specific techniques and embodiments are set forth, such as particular sequences of steps, interfaces and configurations, in order to provide a thorough understanding of the techniques presented herein. While the techniques and embodiments will primarily be described in context with the accompanying drawings, those skilled in the art will further appreciate that the techniques and embodiments may also be practiced in other network types.

Reference will now be made in detail to the exemplary embodiments, examples of which are illustrated in the accompanying drawings. Wherever possible, the same reference numbers are used throughout the drawings to refer to the same or like parts.

Figure 1:
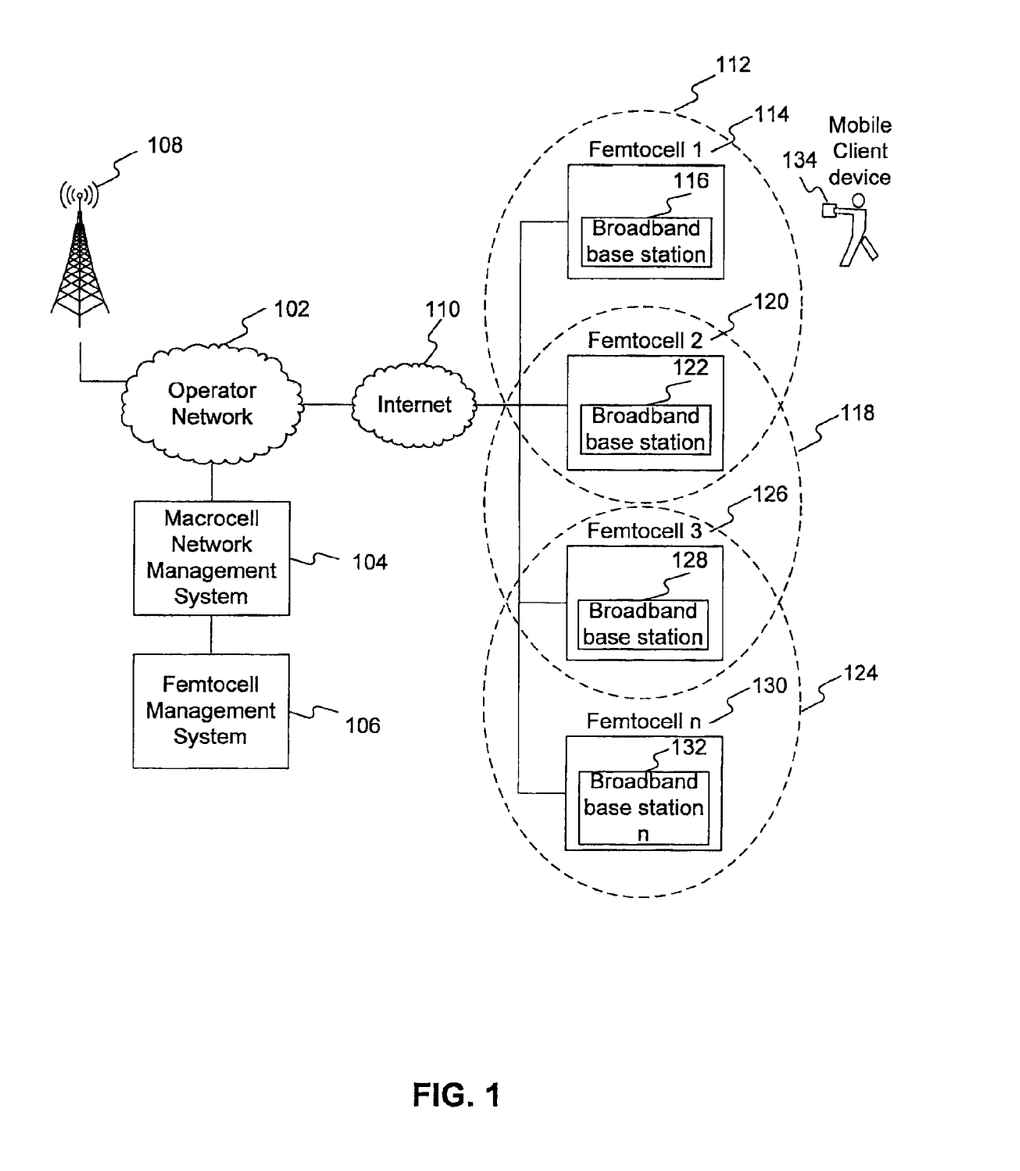
FIG. 1 is a block diagram illustrating a wireless communication system in accordance with an exemplary embodiment.

FIG. 1 is a block diagram illustrating a wireless communication system 100 in accordance with an exemplary embodiment. Communication system 100 facilitates communication between various electronic devices by way of operator network 102 and its respective management systems: macrocell network management system 104 and femtocell network management system 106. Macrocell network management system 104 and femtocell network management system 106 are separate systems, though they may be implemented by a single processor in a single computer. Operator macrocell network 104 operates base station 108 to create a macrocell network. Base station 108 represents multiple base stations but for the sake of clarity in the figure, only one station is shown. Base station 108 operates to provide service coverage to macrocell network 112, macrocell network 118, and macrocell network 124. This service coverage may be implemented by an RF signal.

Operator network 102 is further connected to the Internet 110 and configured to provide a femtocell networks using broadband base station 116, broadband base station 122, broadband base station 128, and broadband base station n 132. Broadband base station 116, broadband base station 122, broadband base station 128 and broadband base station n 132 create femtocell network 114, femtocell network 120, femtocell network 126 and femtocell network n 130 respectively. While femtocell network 114, femtocell network 120, and femtocell network 126 are shown, the number of femtocell networks provided via broadband base station n 132, the Internet 110, and operator network 102 may be greater or less than that shown. Femtocell network n 130 represents that the number of femtocell networks operated by macrocell network 104 is dictated by the needs of mobile station user 134 and the service provider. The service coverage to broadband base station 116, broadband base station 122, broadband base station 128, and broadband base station n 132 may be implemented by a broadband signal. Broadband base station 116, broadband base station 122, broadband base station 128, and broadband base station n 132 may then establish communication with mobile client device 134 using an RF signal.

Mobile client devices may be mobile electronic devices. In particular, such mobile devices may include cellular phones, GPS (Global Positioning System) phones or radios, laptop computers, personal digital assistants (PDAs), handheld electronic devices with Internet access, and other devices enabling mobile communication though this list should be construed as representative of the types of mobile electronic devices suitable for use in communication system 100.

As shown in communication system 100, macrocell network 112, macrocell network 118, and macrocell network 124 cover contiguous and overlapping service areas. In this configuration, mobile client device 134 may freely move between the macrocell networks without interruption to the service coverage. Further, macrocell network 112 overlaps and covers femtocell network 114 and femtocell network 120. Macrocell network 118 and macrocell network 124 likewise overlap and cover femtocell network 120, femtocell network 126, and femtocell network n 130 as shown. This configuration ensures sufficient service coverage such that mobile client device 134 entering femtocell network 114, for example, will maintain an uninterrupted communication link. According to one embodiment, more than one macrocell network may overlap and cover a femtocell network.

Femtocell network 114, femtocell network 120, femtocell network 126, and femtocell network n 130 may be implemented in small geographic areas. Structures such as homes, offices, libraries, businesses, restaurants, theaters, and any other places where cellular phone service is desired and obstructed are particularly suitable for femtocell networks. Structures are typically constructed out of wood, steel, concrete, and other building materials that may degrade an RF signal. Because RF signals may not effectively penetrate common building materials used today, the RF signal may degrade to the point where a mobile client device within the structure may not receive enough of the signal to maintain a communication link.

Small geographic areas such as structures are particularly suitable for a femtocell network because service may be maintained using a broadband base station to provide service inside the structure. Femtocell network 114, femtocell network 120, femtocell network 126, and femtocell network n 130 in FIG. 1 may be considered to be shown in these types of small geographic areas, though a femtocell network is suitable anywhere. For simplicity of explanation, creation of a femtocell network via a broadband base station will be explained with reference to femtocell network 114 and broadband base station 116 within macrocell network 112, though the following applies to femtocell network 120, femtocell network 126, femtocell network n 130, broadband base station 122, broadband base station 128, broadband base station n 132, macrocell network 118, and macrocell network 124 respectively.

When service is provided through Internet 110 to, for example, broadband base station 116, the service is communicated using a broadband signal. Broadband base station 116 receives the broadband signal and converts the signal into an RF signal. If broadband base station 116 is disposed inside a structure, a strong service signal will be provided to mobile client device 134 because mobile client device 134 may obtain service through broadband base station 116 in femtocell network 114 instead of the RF signal provided by macrocell network 112. Inside the structure, the RF signal provided by macrocell network 112 will be degraded as it passes through the building materials of the structure.

Without femtocell network 114, the RF signal provided by macrocell network 112 may be degraded as it passes through the building materials of the structure, such that mobile client device 134 may lose a service connection link. Once femtocell network 114 is created, however, the RF service signal provided by broadband base station 116 to mobile client device 134 inside the structure will be of sufficient strength to provide service to mobile client device 134. In this situation, the RF signal provided by broadband base station 116 will not be degraded by traveling through the building materials comprising the outer walls of the structure because the signal emanates from broadband base station 116 inside the structure. Thus the signal will be sufficiently strong to maintain a service connection inside the structure.

Figure 2:
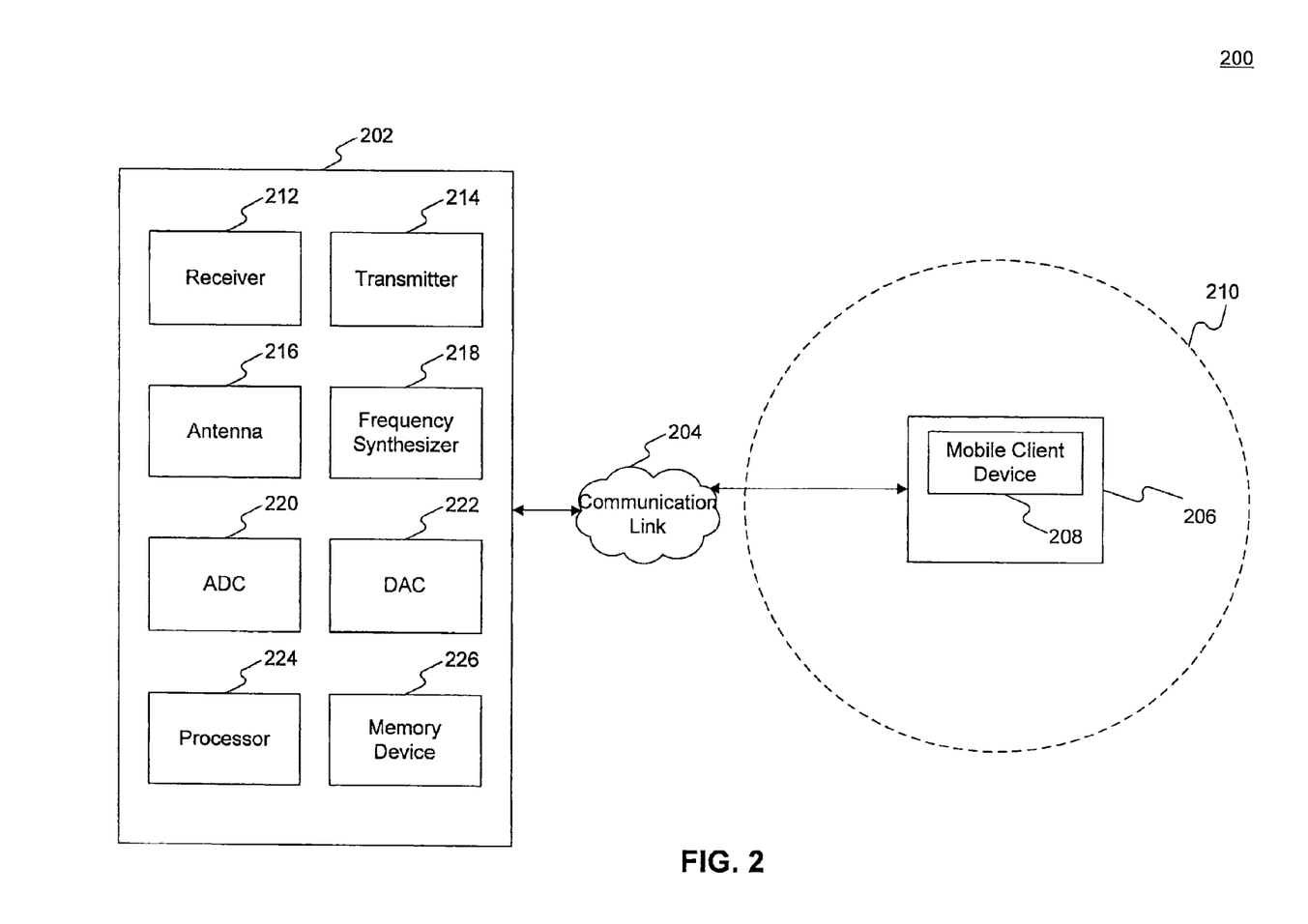
FIG. 2 is a block diagram illustrating a portion of the wireless communication system in accordance with another exemplary embodiment.

FIG. 2 is a block diagram illustrating a portion of wireless communication system 100 shown in FIG. 1 in accordance with an exemplary embodiment. Communication sub-system 200 facilitates communication between various electronic devices by way of processing, transmitting, and/or receiving data via base station 202. Specifically, system 200 may include a communication link 204 that facilitates communication between at least one mobile client device 208, though more or fewer mobile client devices may be implemented in sub-system 200.

Base station 202 may be a base station that provides a macrocell network or it may be a broadband base station that provides a femtocell network. Although only one base station, base station 202, is shown, the number of base stations in communication sub-system 200 is determined by the desired number of macrocell networks and femtocell networks in the network. One base station is required per macrocell network or femtocell network. When base station 202 is viewed as a base station for a femtocell network, base station 202 is a broadband base station and is connected to a broadband signal from the internet. Although macrocell network 210 and femtocell network 206 are shown in FIG. 2, it should be understood that base station 202 may only provide a macrocell network or a femtocell network at one time. Macrocell network 210 and femtocell network 206 are merely shown to illustrate that base station 202 may be a macrocell network base station or a broadband base station.

Communication link 204 may be established between base station 202 and mobile client device 208 using one or more network types, such as a wide-area network (WAN), a local-area network (LAN), a 2G network, a 3G network, a 4G network, a Worldwide Interoperability for Microwave Access (WiMAX) network, a Long Term Evolution (LTE) network, Code-Division Multiple Access (CDMA) network, Wide-band CDMA (WCDMA) network, any type of satellite or cellular network, or any other appropriate protocol to facilitate communication between base station 202 and mobile client device 208.

Communication link 204 is typically wireless and may, but need not, operate in accordance with protocols defined in IEEE (Institute of Electrical and Electronics Engineers) 802.11, 802.11a, 802.11b, 802.11e, 802.11g, 802.11h, 802.11i, 802.11n, 802.16, 802.16d, 802.16e, or 802.16m. Network connections between base station 202 and mobile client device 208 of communication sub-system 200 may be established via satellite, Ethernet, telephone line, cellular channels, or other transmission media.

Each of base station 202 and mobile client device 208 of communication sub-system 200 can include a combination of one or more application programs and one or more hardware components. For example, application programs may include software modules, sequences of instructions, routines, data structures, display interfaces, and other types of structures that execute operation. Further, hardware components may include a combination of Central Processing Units (CPUs), buses, volatile and non-volatile memory devices, storage units, data processors, control devices, transmitters, receivers, antennas, transceivers, input devices, output devices, network interface devices, and other types of components that are apparent to those skilled in the art.

Consistent with an embodiment, mobile client device 208 may send and/or receive data via communication link 204, and may perform various processing operations using the data. For example, data may be processed by base station 204 to acquire system configurations of a mobile client device, for example, mobile client device 208.

As is illustrated in FIG. 2, base station 202 may include one or more of a receiver 212 for receiving data, a transmitter 214 for transmitting data, and an antenna 216 for directing transmission and reception of data. Base station 202 may also include a frequency synthesizer 218 for controlling the frequency of signals transmitted by transmitter 214, an analog-to-digital converter (ADC) 220 for down-converting signals, a digital-to-analog converter (DAC) 222 for up-converting signals, a processor 224, and a memory device 226. Memory device 226 may include any or all forms of non-volatile or volatile memory, including, by way of example, semiconductor memory devices, such as EPROM, RAM, ROM, DRAM, EEPROM, and flash memory devices; magnetic disks such as internal hard disks and removable disks; magneto-optical disks; CD-ROM disks; and other types of computer-readable storage media. Base station 202 may also include additional components. Mobile client device 208 may include components similar to the ones included in base station 202.

Although the exemplary embodiment of communication system 200 is described as having particular components arranged in a particular manner, one skilled in the art will appreciate that communication system 200 may include additional or fewer components that may be arranged differently. Communication sub-system 200 may also be distributed among other sub-systems operating in concert to implement the system. For example, communication sub-system 200 may be implemented with a plurality of mainframe computers, base stations, subscriber stations, computing devices, access points, and/or mobile client electronic devices such as workstations, notebook computers, global positioning devices, cellular telephones, satellite telephones, and other handheld electronic devices.

Figure 3:
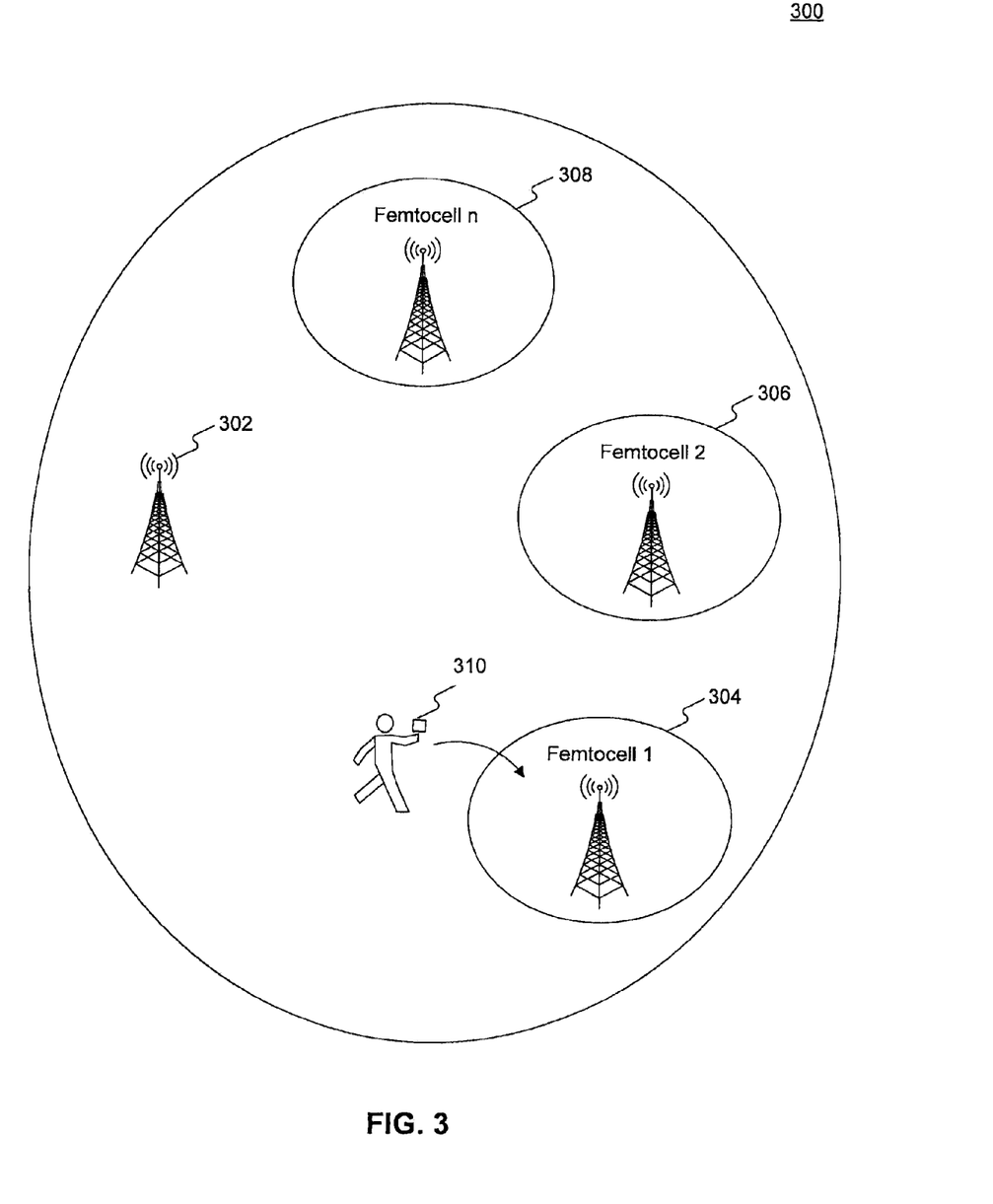
FIG. 3 is a block diagram of an exemplary handover, in accordance with another exemplary embodiment.

Referring now to FIG. 3, FIG. 3 is a block diagram of an exemplary handover, in accordance with another exemplary embodiment; The handover shown in FIG. 3 will be referred to as a "hand in." Wireless network environment 300 shows a base station 302 operating in a given geographic area. In this geographic area, femtocell network 304, femtocell network 306, and femtocell network n 308 are established. In wireless network environment 300, mobile client device 310 is currently receiving service from base station 302. But, as is indicated by the arrow, mobile client device is entering the service area of femtocell network 304. Because mobile client device 310 is moving from the service area of base station 302 to a new service area provided by femtocell network 304, mobile client device 310 requires a handover. When mobile client device 310 requires a handover due to leaving the service area of a macrocell network for the service area of a femtocell network, this handover is referred to as a "hand in."

Figure 4:
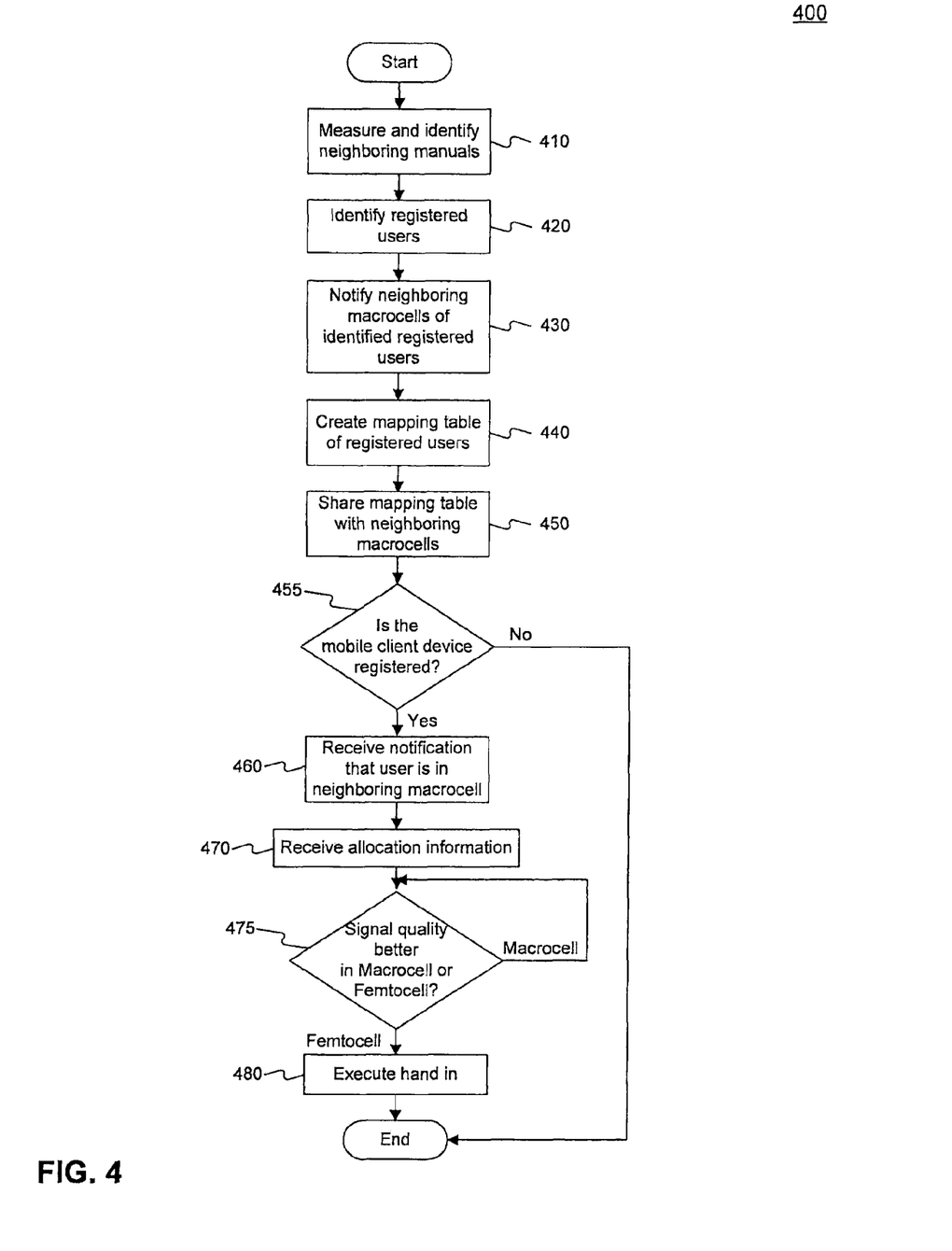
FIG. 4 is a flow chart of an exemplary method for executing handover between a macrocell network and a femtocell network, in accordance with another exemplary embodiment.

Referring now to FIG. 4, method of implementing a femtocell network executing a hand in within a wireless network environment 400 is shown. Method 400 begins at step 410 when a femtocell network is created within a wireless network environment such as wireless network environment 100, shown in FIG. 1. Other elements of wireless network environment 100 such as femtocell network 114 provided by broadband base station 116, macrocell network base station 108, and mobile client device 134 will be referenced below with respect to the description of method 400. While these elements are referenced only for purposes of description, it is apparent that many femtocell networks may be implemented within many macrocell networks in any combination of femtocell networks and macrocell networks. For example, each of femtocell networks 114,120, 126, and 130 could be operating within a single macrocell network at the same time, each network simultaneously executing method 400 for every mobile client device in the network system.

Continuing at step 410, the femtocell network is created when a broadband base station is installed. Such broadband base stations are typically plug and play devices. A plug and play device is a device which when installed requires little or no user interaction to configure. Broadband base stations may be implemented as broadband routers, a femtocell base station, or a Home e-nodeB femtocell base station. At step 410, when the broadband base station is installed, it will automatically measure the signal strength of the neighboring macrocell networks. A neighboring macrocell network is a macrocell network that transmits a signal of sufficient strength such that the broadband base station could receive the macrocell network's signal. A femtocell network may have a single neighboring macrocell network or it may have many. But, for purposes of explanation, a single macrocell network will be referenced.

As part of the measurement in step 410, the broadband base station will identify each of the neighboring macrocell networks by exchanging cell information with the neighboring macrocell network. Cell information may include the link quality between neighboring cells, the frequency occupancy usage, synchronization parameters, and other information. Information my be exchanged over the broadband connection through operator macrocell network 104 shown in FIG. 1 or it may be shared wirelessly with the base station providing the macrocell network directly.

At step 420, the broadband base station will record the identifier of its registered users. Registered users will possess a mobile client device such as mobile client device 134 shown in FIG. 1. Registration can be accomplished using any known method of registration. For example, the mobile client device can be registered to the system using a MAC address, telephone number, station ID, TMSI (Temporary Mobile Subscriber Identity), or some other unique identifier. The system may further assign a key or a set of keys unique to the mobile client device as a unique identifier. While this is not an exhaustive list of unique identifiers that may be used for registration purposes, so long as the mobile client device is uniquely identified to the system, the mobile client device may be registered with the system.

Once the broadband base station has identified each of its potential registered users, the broadband base station will notify the neighboring macrocell networks of the users it has registered as shown in step 430. Notification includes communicating the unique identifier of the registered user to the base station providing the neighboring macrocell network. At step 440, the broadband base station creates a mapping table which maps registered users to the broadband base station and shares the mapping table with the macrocell networks at step 450. A broadband base station may share the mapping table with its neighboring macrocell network through the operator macrocell network, or it may be directly shared wirelessly with the base station providing network communication. Every macrocell network base station that any broadband base station considers to be a neighboring base station stores the mapping table from every neighboring broadband base station.

A mobile client device enters the macrocell network at step 455. The macrocell network base station will query the mobile client device for its unique identifier. Upon receiving the mobile client device unique identifier, the macrocell network base station proceeds to step 455 where it will compare the unique identifier to the unique identifiers stored in the mapping table it received from the broadband base station in step 450. If a match is not achieved, the mobile client device is not a registered mobile client device for that particular broadband base station. In that case, a hand in is not executed and the hand in method ends for that mobile client device (455-No).

If a match is achieved, (455-Yes) then the mobile client device is considered a registered mobile client device for the mobile client device. When the mobile client device is identified as a mobile client (455-Yes), the broadband base station will receive a notification (460) from the macrocell network base station that a registered device may request a hand in.

The mobile client device may leave the macrocell network and move to another macrocell network at any time after step 460 and before a hand in is executed at step 480. For simplicity of explanation, however, the user leaving the macrocell network is not shown because it may happen at any point after the notification is received in step 460 and before the hand in is executed at step 480.

Now with reference to step 470, the broadband base station will receive allocation information from the macrocell network base station either through the broadband connection or directly through the wireless connection. Allocation information may include information that represents the time and frequency describing the mobile client device's transmission channel.

Now, with reference to step 475, when the mobile client device first enters the service area of the macrocell network, the mobile client device will likely be beyond the area in which the broadband base station could recognize the mobile client device. Thus, when the mobile client device first enters the macrocell network, the signal strength provided to the mobile client device through the macrocell network will always be stronger than the signal strength of the femtocell network (475-Macrocell).

After the first time the mobile client device is identified by the macrocell network, the broadband base station and the macrocell network and the broadband base station femtocell network is notified at step 460, both the macrocell network base station and the broadband base station femtocell network will monitor the relative signal strengths from the mobile client devices within its communication range. The broadband base station femtocell network may receive the transmission channel allocation by receiving the allocation information in step 470. It may then monitor data transmissions from the mobile client device to determine the signal strength of the mobile client device. So long as the mobile client device data received by the broadband base station femtocell network is under a pre-set threshold link quality and the mobile client device is still within the macrocell network, the method will remain at step 475 (475-Macrocell).

Though not shown, an optional wait step may be performed. Waiting between signal comparisons decreases the amount of processing required to maintain method 400 and therefore improves the overall efficiency of the system. The period of the wait can be set by the system operator in accordance with the needs and desires of the particular system. While this step is optional and can be entirely avoided and a continuous scan could be performed, the wait step is advantageous for the reasons discussed above. If the mobile client device leaves the macrocell network, the method ends. When the mobile client device data received by the broadband base station femtocell network is over a pre-set threshold link quality (475-Femtocell network), the method 400 moves to step 480.

When the service signal received by the broadband base station from the mobile client device satisfies a predetermined link quality, the broadband base station will provide the mobile client device with a service signal, as shown in step 480. Step 480 is the execution of a hand in type handover. Method 400 guarantees excellent signal strength within the broadband base station femtocell network. Because the mobile client device is shadowed by the broadband base station femtocell network when it is identified as a registered mobile client device, this method decreases synchronization time between the macrocell network base station and the broadband base station femtocell network largely due to the shared mapping table of unique mobile client device identifiers.

Method 400 ends when the hand in is complete. If the user leaves the femtocell network once it relies on the femtocell network for service, another type of handover is executed as will be discussed below.

Figure 5:
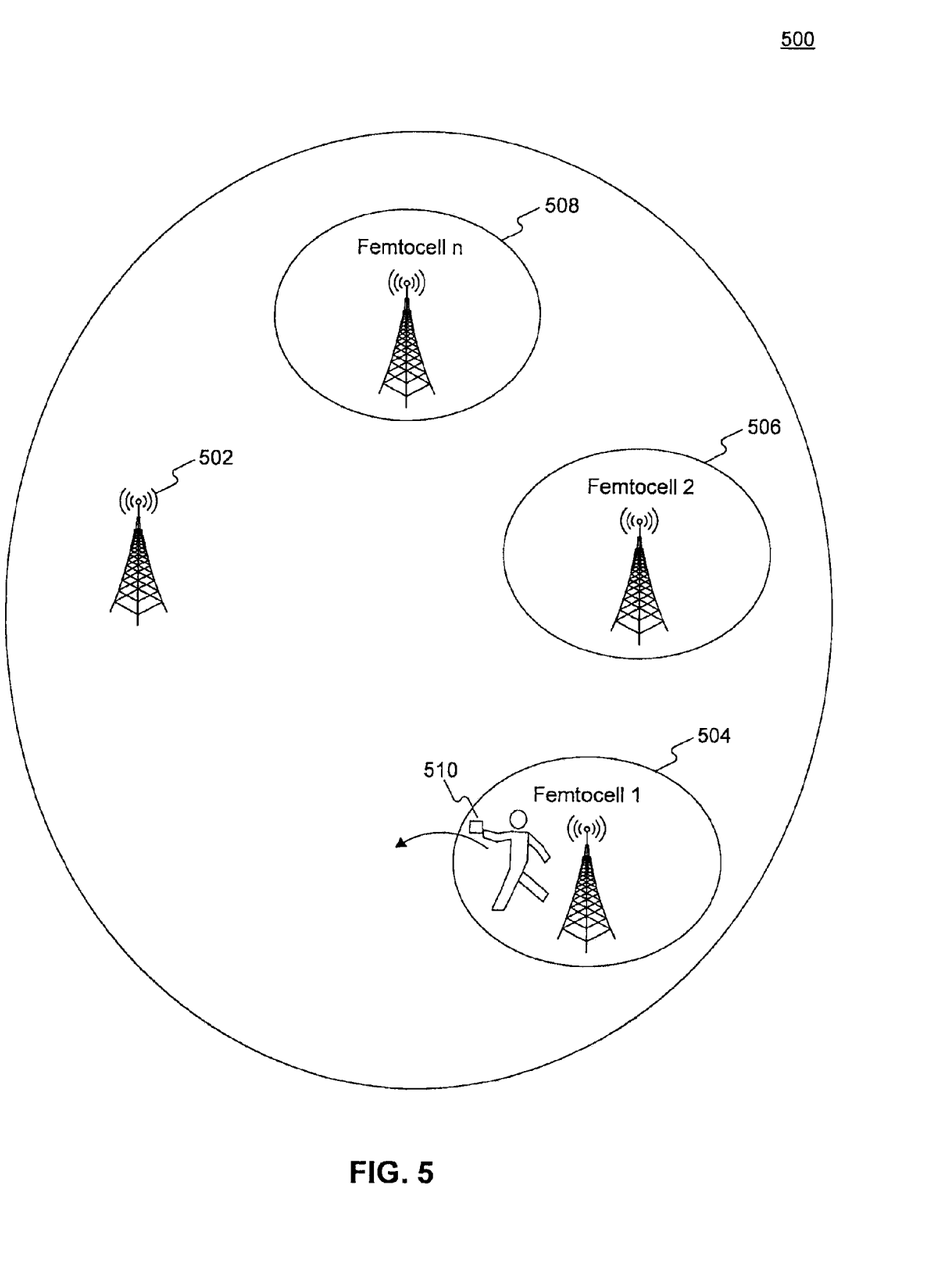
FIG. 5 is a block diagram of an exemplary handover, in accordance with another exemplary embodiment.

Referring now to FIG. 5, FIG. 5 is a block diagram of an exemplary handover, in accordance with another exemplary embodiment; The handover shown in FIG. 5 will be referred to as a "hand out." Wireless network environment 500 shows a macrocell network base station 502 operating in a given geographic area. In this geographic area, femtocell network 504, femtocell network 506, and femtocell network n 508 are established. In wireless network environment 500, mobile client device 510 is currently receiving service from femtocell network 504. But, as is indicated by the arrow, mobile client device 510 is entering the macrocell network service area provided by macrocell base station 502. Because mobile client device 510 is moving from the service area of femtocell network 504 to a new macrocell network service area provided by macrocell base station 502, mobile client device 510 requires a handover. When mobile client device 510 requires a handover due to entering the service area of a macrocell network from the service area of a femtocell network, this handover is referred to as a "hand out."

Figure 6:
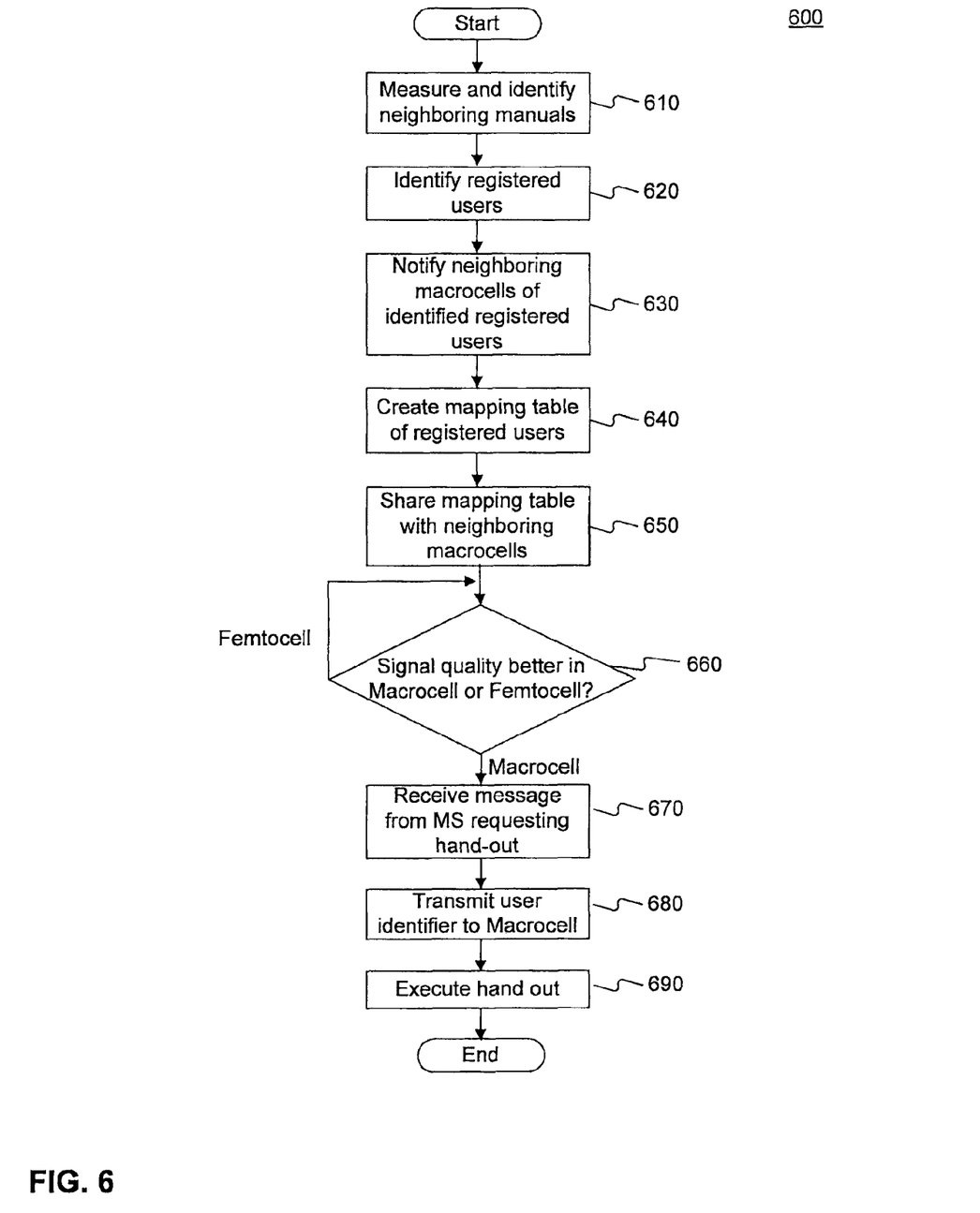
FIG. 6 is a flow chart of an exemplary method for executing handover between a femtocell network and a macrocell network, in accordance with another exemplary embodiment.

Referring now to FIG. 6, method of implementing a femtocell network executing a hand out within a wireless network environment 600 is shown. Method 600 begins at step 610 when a femtocell network is created within a wireless network environment such as wireless network environment 100, shown in FIG. 1. Other elements of wireless network environment 100 such as femtocell network 114 provided by broadband base station 116, macrocell network base station 108, and mobile client device 134 will be referenced below with respect to the description of method 600. While these elements are referenced only for purposes of description, it is apparent that many femtocell networks may be implemented within many macrocell networks in any combination of femtocell networks and macrocell networks. For example, each of femtocell networks 114, 120, 126, and 130 could be operating within a single macrocell network at the same time, each network simultaneously executing method 600 for every mobile client device in the network system.

Continuing at step 610, the femtocell network is created when a broadband base station is installed. Such broadband base stations are typically plug and play devices. A plug and play device is a device which when installed requires little or no user interaction to configure. At step 610, when the broadband base station is installed, it will automatically measure the signal strength of the neighboring macrocell networks. A neighboring macrocell network is a macrocell network that transmits a signal of sufficient strength that the broadband base station could communicate with the macrocell network. A femtocell network may have a single neighboring macrocell network or it may have many. But, for purposes of explanation, a single macrocell network will be referenced.

As part of the measurement in step 610, the broadband base station will identify each of the neighboring macrocell networks by exchanging cell information with the neighboring macrocell network. Cell information may include the link quality between neighboring cells, the frequency occupancy usage, synchronization parameters, and other information. Information my be exchanged over the broadband connection through operator macrocell network 104 shown in FIG. 1 or it may be shared wirelessly with the base station controlling the macrocell network directly.

At step 620, the broadband base station will record the identifier of its registered users. Registered users will possess a mobile client device such as mobile client device 134 shown in FIG. 1. Registration can be accomplished using any known method of registration. For example, the mobile client device can be registered to the system using a MAC address, telephone number, station ID, TMSI (Temporary Mobile Subscriber Identity), or some other unique identifier. The system may further assign a key or a set of keys unique to the mobile client device as a unique identifier. While this is not an exhaustive list of unique identifiers that may be used for registration purposes, so long as the mobile client device is uniquely identified to the system, the mobile client device may be registered with the system.

Once the broadband base station has identified each of its potential registered users, the broadband base station will notify the neighboring macrocell networks of the users it has registered as shown in step 630. Notification includes communicating the unique identifier of the registered user to the base station controlling the neighboring macrocell network. At step 640, the broadband base station creates a mapping table which maps registered users to the broadband base station and shares the mapping table with the macrocell networks at step 650. A broadband base station may share the mapping table with its neighboring macrocell network through the operator macrocell network, or it may be directly shared wirelessly with the base station providing network communication. Every macrocell network base station that any broadband base station considers to be a neighboring base station stores the mapping table from every neighboring broadband base station.

At step 660, the mobile client device will measure the service signal from the broadband base station. If the signal is satisfies a certain predetermined quality threshold (660-Femtocell network), the mobile client device will wait for a period of time before measuring again or if it is measuring continuously, the mobile client device will wait until such time as the signal quality is better from the neighboring macrocell network. When the signal quality falls below the predetermined quality threshold (660-Macrocell network) the femtocell network is providing a poor quality service signal. At step 670, the femtocell network will receive a message from the mobile client device requesting a hand out to the macrocell network base station network. The femtocell network will determine which neighboring macrocell base station network provides the mobile client device with the best quality service signal and begins the handout negotiation with the macrocell network.

In step 680, the femtocell network will transmit the mobile client device's unique identifier to the target macrocell network base station that provides the highest quality service signal when compared with the neighboring broadband base stations. The macrocell network base station may respond with allocation information, action time for the broadband base station, or both. In response, the broadband base station will transmit information to the mobile client device. This transmission may include the hand out target, action time, allocation information, link parameters for the macrocell base station acquired by the broadband base station's measurements, and other information. When the macrocell network base station successfully receives the unique identifier, the hand out is executed at step 690. At this point, the mobile client device relies on the service signal from the macrocell network base station to maintain its communication link with the system and the hand out is complete. Method 600 ends.

Advantageously, there is no need to determine whether a mobile client device is registered during the hand out process because any device that is receiving service from the femtocell network must already be registered. Thus, hand out time is further reduced to increase the overall efficiency of the system.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A communication system comprising:
   a broadband base station in a femtocell network for providing a first service signal and creating a mapping table configured to include at least one unique identifier of a mobile client device; and
   a base station in a macrocell network for providing a second service signal and receiving the mapping table from the broadband base station, the base station being configured to determine, based on the mapping table, that the mobile client device is a registered mobile client device for the broadband base station;
   wherein the broadband base station is configured to determine a link quality of a service signal received from the mobile client device and to determine whether to provide the first service signal to the mobile client device based on the determined link quality.

2. The communication system of claim 1, wherein the unique identifier further comprises a MAC address, telephone number, station ID, TMSI, a single key, a set of keys, or a number assigned to the mobile client device.

3. The communication system of claim 1, wherein the broadband base station is a broadband router, a femtocell base station, or a Home e-nodeB femtocell base station.

4. The communication system of claim 3, wherein the broadband router is a plug and play broadband router.

5. The communication system of claim 1, wherein the base station determines that the mobile client device is registered by matching the unique identifier of the mobile client device to the at least one unique identifier included in the mapping table.

6. The communication system of claim 5, wherein when the base station determines that the mobile client device is registered, the base station transmits a notification to at least one neighboring broadband base station identifying the registered mobile client device to the broadband base station.

7. The communication system of claim 5, wherein the broadband base station provides the first service signal to the mobile client device when the service signal received by the broadband base station from the mobile client device satisfies a predetermined link quality.

8. The communication system of claim 1, wherein the base station provides the second service signal to the mobile client device when the service signal received by the broadband base station from the mobile client device does not satisfy a predetermined link quality.

9. A method of executing a handover between a broadband base station and a base station in a communication system, the method comprising:
   providing a first service signal via a broadband base station in a femtocell network;

providing a second service signal via a base station in a macrocell network;

creating a mapping table configured to include a unique identifier of a mobile client device in the broadband base station;

transmitting the mapping table from the broadband base station to the base station;

determining, by the base station, if the mobile client device is a registered mobile client device for the broadband base station based on the mapping table; and determining, by the broadband base station, a link quality of a service signal received from the mobile client device, and based on the link quality determining whether to provide the first service signal to the mobile client device.

10. The method of claim 9, wherein the unique identifier further comprises a MAC address, telephone number, station ID, TMSI, a single key, a set of keys, or a number assigned to the mobile client device.

11. The method of claim 9, further comprising:
determining whether a mobile client device is registered by matching the unique identifier of the mobile client device to at least one unique identifier included in the mapping table.

12. The method of claim 11, wherein determining a mobile client device is registered further comprises:
transmitting a notification to at least one neighboring broadband base station identifying the registered mobile client device to the broadband base station.

13. The method of claim 11, further comprising:
providing the first service signal to the mobile client device when the service signal received by the broadband base station from the mobile client device satisfies a predetermined link quality.

14. The method of claim 9, further comprising:
providing the second service signal to the mobile client device when the service signal received by the broadband base station from the mobile client device does not satisfy a predetermined link quality.

15. A computer-readable storage medium comprising computer instructions which when executed on a computer processor cause the processor to perform a method of executing a handover between a broadband base station and a base station in a communication system, the method comprising:
providing a first service signal via a broadband base station in a femtocell network;
providing a second service signal via a base station in a macrocell network;

creating a mapping table configured to include a unique identifier of a mobile client device in the broadband base station;

transmitting the mapping table from the broadband base station to the base station;

determining, by the base station, if the mobile client device is a registered mobile client device for the broadband base station based on the mapping table; and determining, by the broadband base station, a link quality of a service signal received from the mobile client device, and based on the link quality determining whether to provide the first service signal to the mobile client device.

16. The computer-readable storage medium of claim 15, wherein the unique identifier further comprises a MAC address, telephone number, station ID, TMSI, a single key, a set of keys, or a number assigned to the mobile client device.

17. The computer-readable storage medium of claim 15, further comprising:
determining whether a mobile client device is registered by matching the unique identifier of the mobile client device to at least one unique identifier included in the mapping table.

18. The computer-readable storage medium of claim 17, wherein determining a mobile client device is registered further comprises:
transmitting a notification to at least one neighboring broadband base station identifying the registered mobile client device to the broadband base station.

19. The computer-readable storage medium of claim 17, further comprising:
providing the first service signal to the mobile client device when the service signal received by the broadband base station from the mobile client device satisfies a predetermined link quality.

20. The computer-readable storage medium of claim 15, further comprising:
providing the second service signal to the mobile client device when the service signal received by the broadband base station from the mobile client device does not satisfy a predetermined link quality.

* * * * *